United States Patent [19]

Covey

[11] Patent Number: 4,861,256
[45] Date of Patent: Aug. 29, 1989

[54] INJECTION MOLDING TOOL
[75] Inventor: Michael K. Covey, West Linn, Oreg.
[73] Assignee: The Anchor Group, Vancouver, Wash.
[21] Appl. No.: 160,263
[22] Filed: Feb. 25, 1988

Related U.S. Application Data
[63] Continuation-in-part of Ser. No. 877,309, Jun. 23, 1986, abandoned, which is a continuation-in-part of Ser. No. 837,428, Mar. 7, 1986, abandoned.

[51] Int. Cl.$^4$ ............................................... B29C 35/00
[52] U.S. Cl. ........................... 425/378.1; 29/148.4 B; 29/402.18; 425/380
[58] Field of Search ...................... 29/148.4 B, 148.5 B, 29/149.5 R, 402.01, 148.4 R, 402.18, 724; 222/146.5, 389; 425/376 R, 378 R, 380; 264/36

[56] References Cited
U.S. PATENT DOCUMENTS

| | | | |
|---|---|---|---|
| 3,199,740 | 8/1965 | Juffa et al. | 222/146 |
| 3,650,004 | 3/1972 | Bergstrom. | |
| 3,877,610 | 4/1975 | Dickey | 222/146 |
| 3,980,209 | 9/1976 | Collar | 222/323 |
| 4,065,034 | 12/1977 | Callan | 222/146 |
| 4,317,529 | 3/1982 | Liebhard | 222/146.5 |
| 4,457,457 | 7/1984 | Dziki | 222/146.5 |
| 4,548,341 | 10/1985 | Hambleton | 222/146.5 |
| 4,552,287 | 11/1985 | Dziki | 222/146.5 |
| 4,571,811 | 2/1986 | Pruvost | 29/149.5 B |
| 4,592,721 | 6/1986 | Charlebois et al. | 222/389 |

Primary Examiner—Howard N. Goldberg
Assistant Examiner—Irene Cuda
Attorney, Agent, or Firm—Eugene M. Eckelman

[57] ABSTRACT

The structure comprises a fluid operated cylinder driving a piston rod in a barrel adapted to be connected to a mold for injection. The piston rod extends from one-half to two-thirds the length of the barrel whereby the molten portion of solid plastic cartridges is ejected by the piston rod pushing on the solid portion of the cartidges. The piston rod has one or more lateral recesses to catch molten material that may escape rearwardly past the solid cartridges. Novel indicators are employed to monitor plastic flow. The inner surface of the barrel is tapered adjacent the outlet end thereof for efficient flow of molten material. The barrel at an ejecting nozzle thereof is heated by a torch or by a heat band secured thereto. An inner core is provided for efficiently mixing and heating the plastic. A thermocouple and an electrically operated display device are combined with a temperature adjusting device for providing controlled temperature conditions. A swivel support is mounted on the rear of the tool for supporting it in an operating function. In one embodiment, the piston for driving the piston rod is hydraulically driven by a gas pressure piston cylinder assembly connected thereto by a flexible hose.

17 Claims, 5 Drawing Sheets

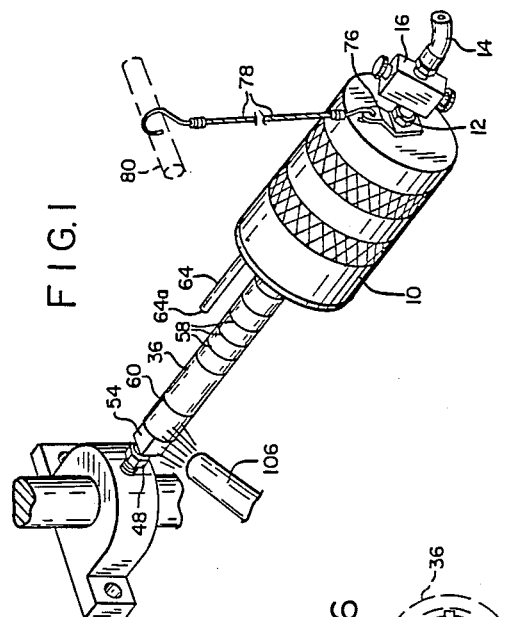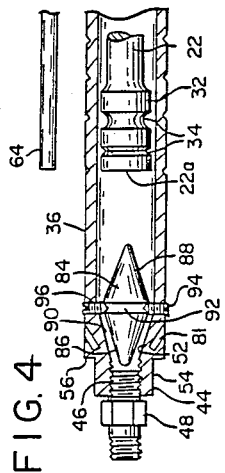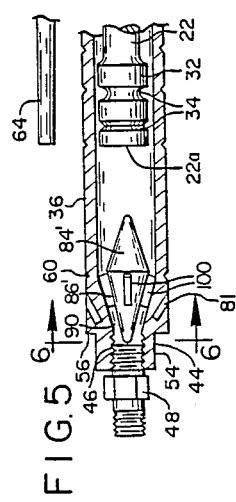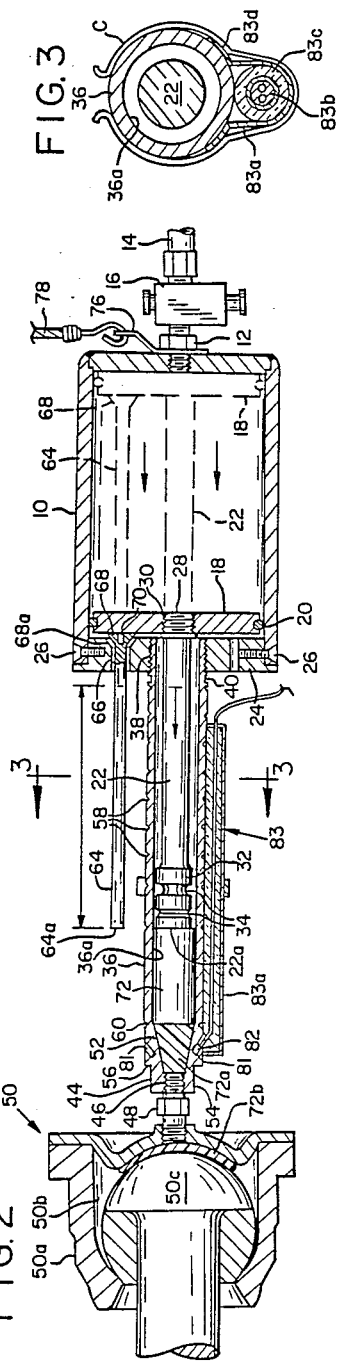

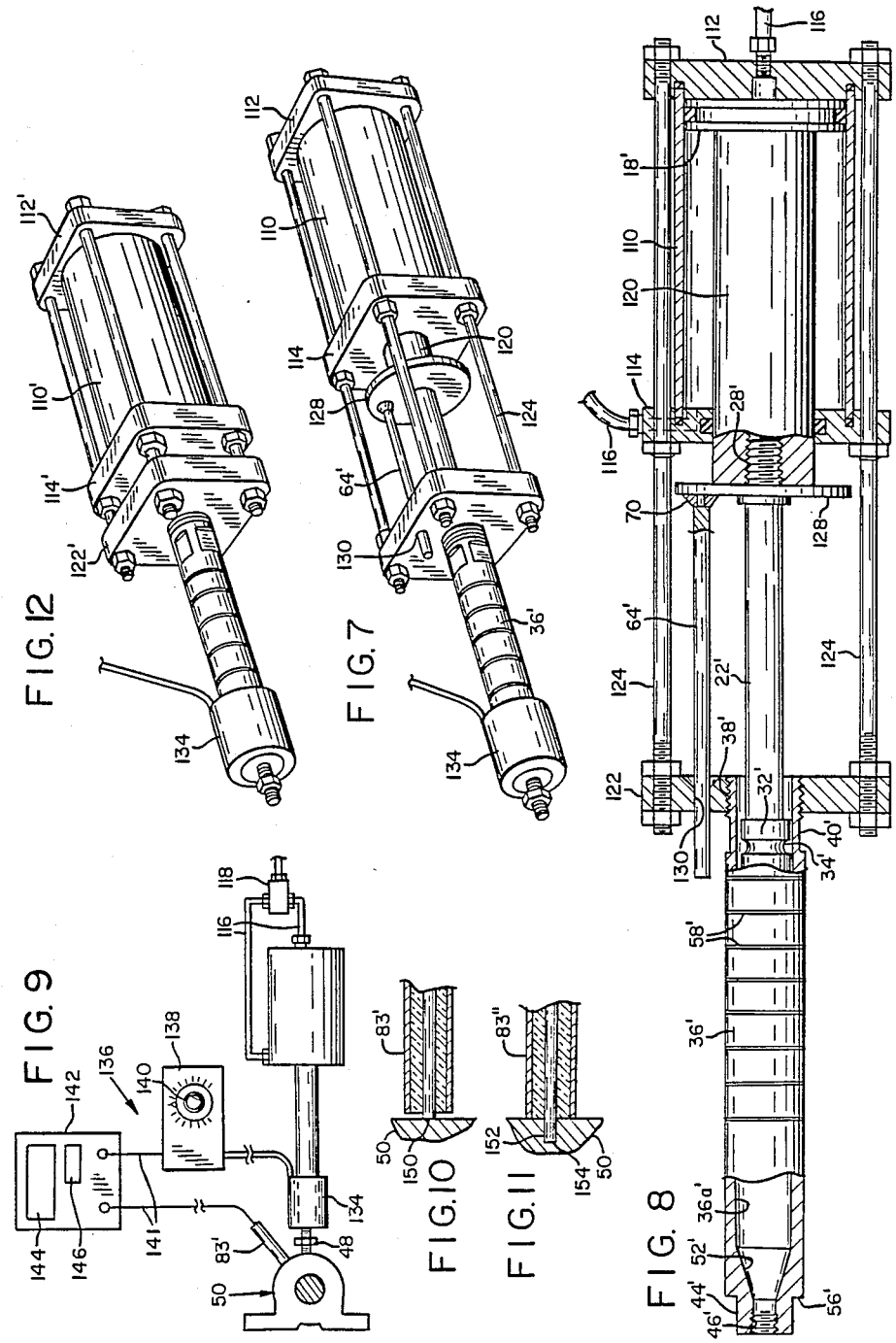

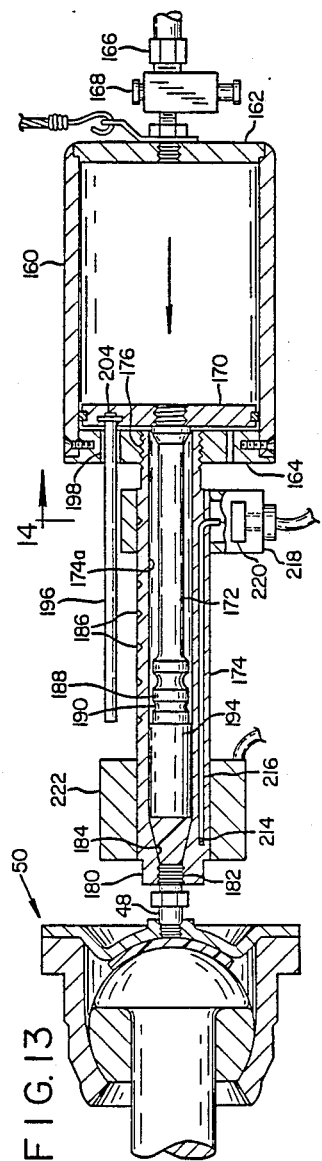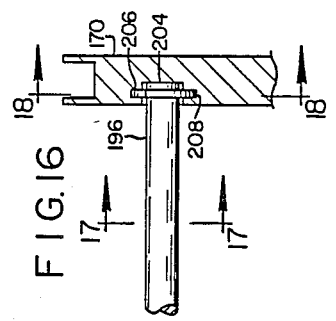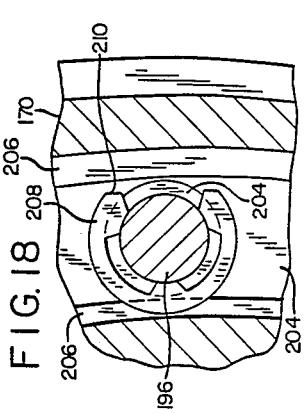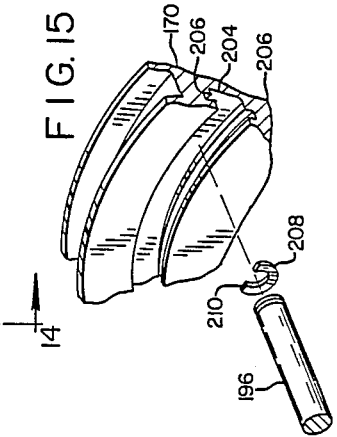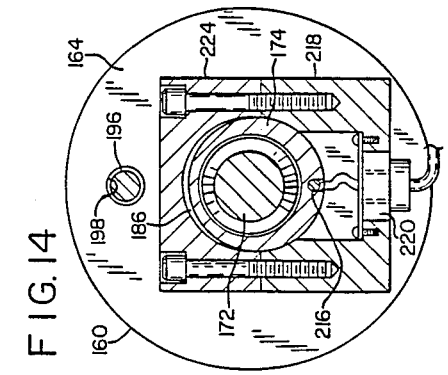

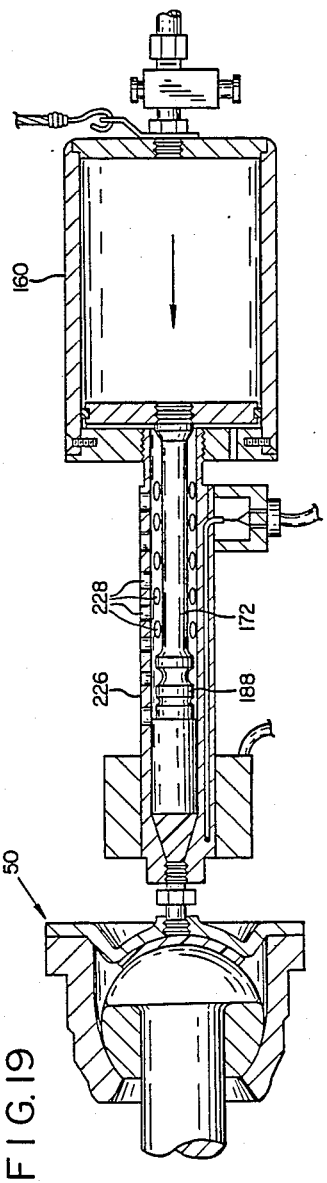
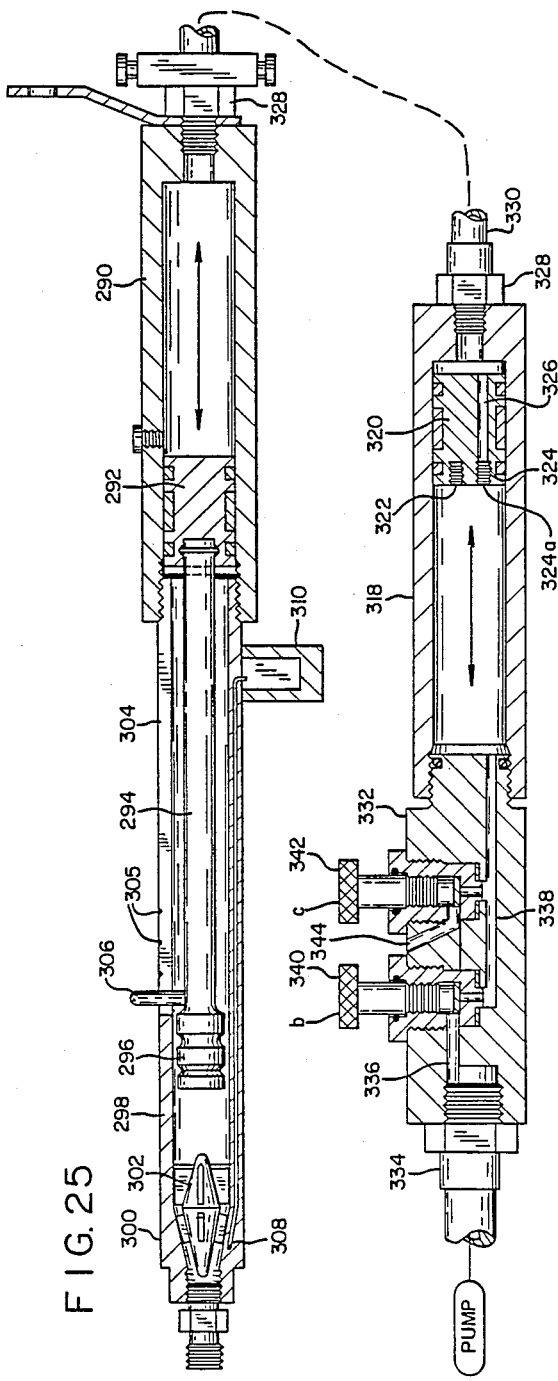
FIG.19
FIG.25

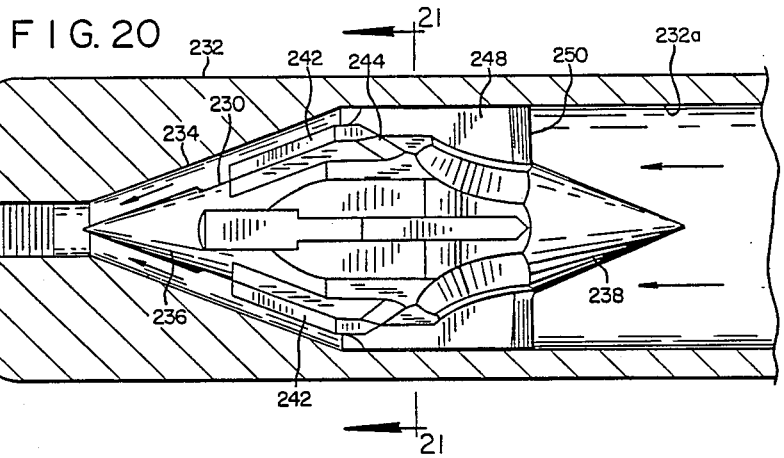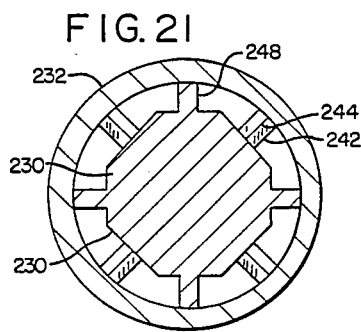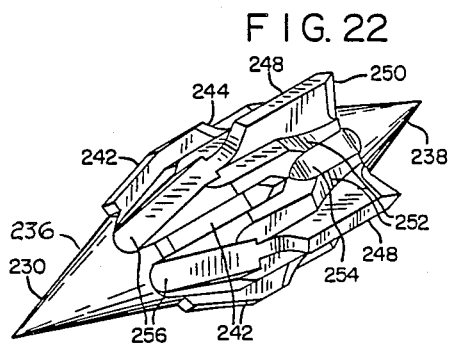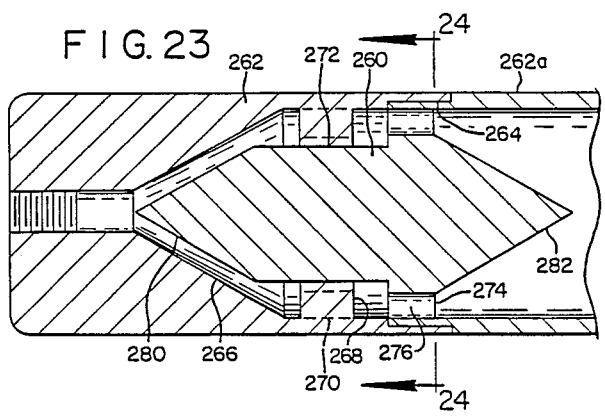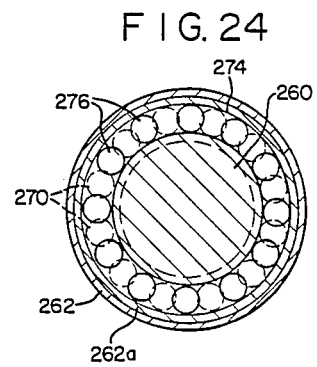

INJECTION MOLDING TOOL

REFERENCE TO PRIOR APPLICATIONS

This application is a continuation-in-part of Ser. No. 877,309, filed June 23, 1986, now abandoned, which in turn is a continuation-in-part of Ser. No. 837,428, filed Mar. 7, 1986, now abandoned.

BACKGROUND OF THE INVENTION

This invention relates to new and useful improvements in injection molding tools. As one use thereof, it can be used effectively to repair or renew spherical ball joints and bushings, such as vehicle ball joints, journals, shaft bushings, and the like, without disassembling the confining parts of the ball joint and bushings.

It has heretofore been known to repair ball joints and bushings by injecting molten material, such as Babbit metals, plastic, synthetic resin compositions or polymers into worn areas of the ball joints and bushings. As set forth in U.S. Pat. No. 3,650,004 a process was described for repairing or renewing such ball joints and bushings while in place on the machinery

SUMMARY OF THE INVENTION

According to the present invention and forming a primary objective thereof, an injection molding tool is provided having improved features arranged for the injection of said molten material into joints and bushings to be repaired or renewed.

A more particular object of the present invention is to provide an injection molding tool of the type described having a novel barrel structure wherein a nozzle portion thereof is of reduced diameter relative to the interior surface of the barrel and such nozzle communicates with the interior surface of the barrel by a tapered barrel surface wherein to provide a more positive and smoother flow of molten material from the barrel to the nozzle.

Another object of the invention is to provide a tool of the type described having a piston or push rod which extends a maximum of approximately one-half to two-thirds the length of the barrel, the molten portion of the resin being ejected by the force of the piston rod pushing on a solid trailing portion of the cartridge or cartridges to the rear of the molten material whereby the molten material does not foul operating parts; and it is a further object to provide one or more peripheral recesses on the piston rod head to catch molten material in the event such material may escape rearwardly past the solid portion of the cartridge or cartridges.

Still another object of the invention is to provide a tool of the type described employing means which allow the operator to determine the extent of piston travel. One such means comprises an indicator rod which normally travels with the piston and projects in parallel relation with the piston rod but exteriorly of the barrel, the length of the indicator rod being such that the free end thereof is precisely laterally aligned with the face or end surface of the head portion of the piston rod whereby to provide a positive location of this head portion as well as the location of a cartridge being pushed by the head portion. Another means for determining piston travel is sighting means in the barrel, such as apertures, or transparent wall portions.

Yet another object of the invention is to provide a heat conducting core within the barrel adjacent the nozzle which distributes and mixes molten material for efficient heating. Another object is to provide means associated with the heated end of the barrel for receiving the sensing end of a thermocouple to monitor precisely the temperature of the material being injected, and also to provide removable holding means for thermocouple mechanism.

Still another object of the invention is to provide an applicating tool of the type described having a swivel connector at its rearward end for providing a swivel support of the tool from an overhead support.

It is also an object of the invention to provide a heat band member mounted on the barrel for applying heat thereto, and also to provide temperature sensing and electronic display means for arriving at proper injecting temperatures.

It is a further object to provide an assembly using an hydraulically operated piston cylinder assembly and a gas pressure operated piston cylinder which drives the hydraulically operated piston cylinder assembly, the two piston cylinder assemblies having communication with each other by a flexible hose, such assembly eliminating the hazards of high gas pressure at the injection device.

In carrying out these objectives, the tool comprises a fluid operated cylinder with an air inlet at one end and a piston operating therein. A piston or push rod has one end secured to the piston and has a free end projecting from the cylinder and terminating in an enlarged head portion with a working face surface. An applicator barrel is secured to the cylinder and terminates in an injecting nozzle with an outlet opening. The piston rod extends into the applicator barrel and is arranged, upon heating the ejecting nozzle and upon operation of the cylinder, to force a molten portion of a solid resin cartridge in the barrel through the nozzle opening. As described in the objectives of the invention, such tool has various improved features which contribute to its efficiency in use. One such feature comprises an hydraulically operated piston cylinder assembly having its driving power derived from an independent gas pressure operated piston cylinder assembly and connected thereto by a flexible hose. Also, in the process of the invention, a thermoplastic material is used as the repairing or renewing material which is capable of being converted repeatedly between a molten state and a solid state whereby to conserve on material being used and also to isolate the piston rod from molten material in the barrel by utilizing a solid portion of the thermoplastic material as a push rod.

The invention will be better understood and additional objects and advantages will become apparent from the following description taken in connection with the accompanying drawings.

BRIEF DESCRIPTION OF THE DRAWINGS

FIG. 1 is a perspective view of a first embodiment of the present tool, the tool shown in this view being air operated and connected to a bushing to be repaired or renewed;

FIG. 2 is an enlarged sectional view taken longitudinally through the tool of FIG. 1, this view showing the tool connected to a spherical ball joint to be repaired or renewed;

FIG. 3 is a transverse sectional view taken on the line 3—3 of FIG. 2;

FIG. 4 is a fragmentary sectional view taken similar to FIG. 2 but showing a modification of the barrel wherein heat conducting core means are provided for directing heat to the interior of the barrel;

FIG. 5 is a view similar to FIG. 4 but showing a modified form of core means;

FIG. 6 is a transverse sectional view taken on the line 6—6 of FIG. 5;

FIG. 7 is a perspective view of a second embodiment of the invention and in particular illustrates the use of an hydraulic cylinder instead of an air cylinder;

FIG. 8 is an enlarged sectional view taken longitudinally through the tool of FIG. 7;

FIG. 9 is an elevational view, partly diagrammatic, showing control means for operation of the tool;

FIG. 10 is an enlarged fragmentary view of thermocouple structure that may be used with the tool;

FIG. 11 is a view similar to FIG. 10 and showing alternative thermocouple structure;

FIG. 12 is a perspective view of a further embodiment of the invention;

FIG. 13 is a longitudinal sectional view of a modification of the invention, a portion of this view being shown in elevation;

FIG. 14 is an enlarged cross sectional view taken on the line 14—14 of FIG. 13;

FIG. 15 is an enlarged fragmentary exploded view showing a support connection for an indicator rod of the embodiment of FIG. 13;

FIG. 16 is an enlarged fragmentary sectional view taken similar to FIG. 13 and showing structural details;

FIG. 17 is an elevational view partly in section, taken on the line 17—17 of FIG. 16;

FIG. 18 is an enlarged sectional view taken on the line 18—18 of FIG. 16;

FIG. 19 is a longitudinal sectional view showing structural details of another embodiment of the invention;

FIG. 20 is a longitudinal sectional view of a barrel portion showing a modified form of core member;

FIG. 21 is a cross sectional view taken on the line 21—21 of FIG. 20;

FIG. 22 is a perspective view of the core member apart from the barrel;

FIG. 23 is a longitudinal sectional view of a further form of core member;

FIG. 24 is a sectional view taken on the line 24—24 of FIG. 23: and

FIG. 25 is a sectional view of a further form of the invention.

DETAILED DESCRIPTION OF PREFERRED EMBODIMENTS

The injection molding tool of the invention can be used for a variety of purposes.

With particular reference to the drawings and first to FIGS. 1 and 2 which show the invention being used in conjunction with repairing a ball joint, a first form of tool comprises an air cylinder 10 having air inlet fittings 12 connected to a source 14 of compressed air and exhaust through an on-off, two position push button valve 16. The push button valve of this type is preferred as compared to a lever or screw-type valve, so as to be operated between on and off positions by one hand, namely, by simply pushing the valve stem thereof from one position to another.

A piston 18 having an edge seal or ring 20 operates within the air cylinder and has a piston or push rod 22 secured thereto which projects through an end wall 24 secured to the end of the cylinder opposite from the air inlet end by radial fasteners 26. The rod 22 is secured to the piston 18 by a suitable connection, such as a threaded connection. Regardless of the type of connection, however, it is desired that the connection 28 be airtight. If a threaded connection is used, weld material 30 is placed around the seam of the threads. Preferably, a combination of metals is used which allows welding at this joint. An air-tight connection is important to the efficiency of operation of the piston, and a weld connection accomplishes such a feature. The piston rod 22 has an enlarged head portion 32 provided with one or more lateral recesses 34 therearound the purpose of which will become more apparent hereinafter.

The rod 22 and its head 32 operate freely in a barrel 36 of the tool which has a smooth, uniform diameter inner surface 36a and which has threaded support 38 on the wall 24 of the cylinder 10. This rod is considerably shorter than the barrel, for example, a maximum of approximately one-half to two-thirds the length thereof. The barrel adjacent the exterior of wall 24 has wrench engaging surfaces 40 thereon. Threaded connection 38 utilizes left-hand threads so that the barrel will not loosen from the cylinder when the tool is being disconnected from a member being repaired or renewed to which connection is made by right-hand threads.

The free or nozzle end 44 of the barrel 36, which as will be seen hereinafter, comprises an end portion arranged to be heated and has a threaded bore 46 for releasable connection to an adapter 48 arranged for connection to a member 50 to be repaired or renewed, such as a ball joint. The threaded bore 46 is smaller in diameter than the inner surface 36a of the barrel and the connecting surface 52 between the bore 46 and surface 36a is tapered. This taper can be any angle less than 90° relative to the longitudinal axis of the barrel. A 15° to 20° taper is preferred. The exterior surface of the barrel at the end of the nozzle is made square or otherwise provided with flat surfaces 54 to provide wrench engaging surfaces. These flattened surfaces end in abrupt shoulder portions 56 at the rear thereof. For a purpose to be described later, the exterior surface of the barrel is provided with peripheral grooves 58 located in evenly spaced or otherwise selected relation from the front of the cylinder. Also, an auxiliary groove 60 is provided at the nozzle end. Grooves 58 are used in combination with an indicator rod 64 to measure piston movement. Such rod passes freely through an aperture 66 in the front wall 24 of the cylinder 10 and has a tapered head 68 which freely fits in a tapered recess 68a in the end wall 24. A magnet 70 is integrally mounted in the head 68 flush with the end thereof, and with the piston 20 constructed of a magnetically conducting material, the rod 64 will be drawn back as well as pushed forward by the piston 20. Rod 64 has an end surface 64a which when the rod 64 is attached to the piston is precisely laterally aligned with the end surface 22a of the piston rod 22, thus indicating the location of the end 22a of the piston rod and also an end of material in the barrel by exterior sighting. Furthermore, the rod serves visually to indicate the distance of travel of the piston rod.

The applicating tool of the invention is utilized with solid cylindrical cartridges or shim stock 72 of a suitable material which can be converted to a molten state upon being subjected to heat and which upon being injected into a worn area sets to a hardenable composition which has impact, bearing and wear characteristics necessary to repair or renew a joint or bushing, as will become more apparent from the operating procedure described herein.

A hanger strap 76 has a swivel mounting on the fitting 12 and is arranged for connection to a cable 78 or the like arranged to be removably attached to any type of overhead support 80. Since the present tool is rather heavy and also must be maintained for a selected period in a fixed position while the molten material is being injected and cooled, the swivel support 76 and its connection to an overhead support can be used to bear the weight of the tool. The swivel support allows movement of the tool when supported.

Barrel 36 adjacent the free end 44 thereof has plug-in sockets 81 for the probe 82 of a thermocouple 83, also seen in FIG. 3. This thermocouple has the usual outer sheath 83a and inner core 83b. A thermocouple adapted for the present purpose, however, has a thick layer 83c of ceramics under the sheath 83a for protection of the core from heat applied directly to the end 44 of the barrel. Also, the sheath has side extensions 83d arranged to fit on and lead partly around the barrel whereby heat applied to the barrel cannot enter between the sheath and the barrel. One or more spring clips C are arranged to hold the thermocouple removably in place. If desired, the probe 82 can be unplugged and the thermocouple detached from the barrel 36 when it is desired that the thermocouple be stored in an out-of-the-way position.

With reference to FIG. 4, an embodiment is illustrated which utilizes an inner core 84 of heat conducting metal. This core has a tapered forward end 86 for extending into the taper 52 of the barrel in parallel relation and a rearward taper 88 which extends rearwardly into the barrel 36. The forward taper 86, although of the same shape as the taper 52, is smaller in diameter than the latter to provide a passageway 90 therearound for the flow of molten material between the barrel and the end of the nozzle. The core member 84 has a lateral peripheral recess 92, and such member is held in place by 3 or more studs 94 having threaded engagement in tapped bores 96 leading radially through the wall of the barrel. Upon threaded engagement of the studs 94 inwardly, their ends engage the recess 92 and hold the core member fixedly but removably in place. The core member 84 and the studs 94 are constructed of a heat conducting material whereby when heat is applied to the exterior portion of the tool, heat not only radiates through the barrel but also radiates through the studs into the core member 84 to provide both exterior and interior heating of the plastic material 72.

In FIGS. 5 and 6 a core member 84' is provided which is similar in purpose and shape as the structure of FIG. 4. This core member, however, is not held in place by setscrews but rather merely has wedging location in the end of the barrel by spacing projections 100 integral with the tapered surface 86'. These projections center the core relative to the tapered surface 82 and form a passageway 90 for the flow of the molten product. Core member 84' is held in place by the product itself under pressure from the piston rod. Although the core member of FIGS. 4 and 5 does not have the radiating studs 94 as in FIG. 4, it nevertheless picks up heat that radiates through the barrel to provide good distribution to the molten product.

With particular reference to FIG. 2 which includes a sectional view of a ball joint 50 to be repaired, the numeral 50a designates the housing of the joint, the numeral 50b designates the interior surface and the numeral 50c designates the ball or other member operating in the joint. The numeral 72a designates the molten portion of a cartridge 72 in the barrel of the tool and the numeral 72b designates the molten material which has been forced into worn areas of the joint. For the purpose of connecting the tool to the joint 50, the adapter 48 is connected to a usual grease fitting aperture on the joint or if necessary the grease fitting aperture is retapped to receive the adapter. If the joint being repaired, such as various types of bushings and other structures, does not have a grease fitting, one or more tapped bores for adapters are provided at the most optimum positions for the entrance of the molten material.

OPERATION

In most instances, the applicating tool of FIG. 1 of the invention can utilize standard shop air pressure of 125-150 psi which injects the molten material into worn spherical ball joints or bushings with a nozzle pressure of approximately 2500 psi. However, in larger units to be repaired or renewed, greater air pressures are necessary and such can be accomplished by using greater input pressure or by using the existing pressure with enlarged piston displacement. The external heat source can be supplied by a hand-held butane torch 106, FIG. 1, or other means.

The first step in the operation is to adapt the tool to the ball joint or bushing. If it has no grease nipple, the ball joint or bushing must be drilled and tapped to accept one or more adapters 48. The tool is threadedly attached to the adapter. It is desired that the bearing or bushing be at rest or in an unloaded condition at the time of injection. The air hose 14 is then connected to the cylinder 10 with the valve 16 closed. It is desired at this time to check the indicator rod 64 to make sure that it has magnetic connection to the piston 20. The valve 16 is then opened to activate cylinder 10. Using a torch or other heating device 106, heat is applied to the mozzle portion 44 of the barrel, the barrel being of suitable material and/or suitably threaded to withstand the elevated temperature which is imparted by the torch. Shoulders 56 of the wrench engaging portion 54 serve somewhat to confine the heating area, and the peripheral groove 60 adjacent the end of the barrel is a guide to indicate to the operator a desired rear limit of application of heat on the barrel. After a short period, the material at the leading end of the cartridge or cartridges 72 will have been converted to a molten state and the indicator rod 64 will thus be seen to move forwardly as a result of the piston 20 and its rod 22 pushing molten material into the bearing or bushing. It is important that the applicator barrel at the nozzle end 44 reach the correct temperature as designated by the thermocouple. It may also be desired or necessary to heat the ball joint or bushing itself, particularly large ball joints or bushings or ones where a thin layer of the repair material is to be inserted. The precise temperature control, as accomplished by the core 84 and the thermocouple saves unused product in the barrel and thus minimizes expense.

When the indicator rod 64 has moved a selected distance or it is apparent to the operator that the joint has been filled, such distance being readily calibrated by the movement of the rod relative to grooves 58, valve 16 is closed. After a short setting period the valve 16 is opened to exhaust air pressure from the cylinder. The applicating tool should then be loosened from the adapter threads. Since the barrel is connected to the cylinder by left hand threads 38 it is usually only necessary to hand rotate the cylinder 10 to loosen its connection to the adapter 48, the left hand threads 38 maintaining securement of the barrel to the cylinder during such rotation If necessary, wrench means can be applied to the portions 54 and 40 for installation or removal. While the barrel is in a loosened connection with the adapter, it should be left in place for a few minutes to allow the injected material to harden. Varying procedures are adaptable to different types of members being repaired or renewed. For example, it may be desired to maintain air pressure in the tool after removing the heat so as to complete a better fill. Also, cooling procedures may be applied to the injecting area to speed the process. Also, at the beginning of the process, it may be desired to push grease into the joint or bearing to make sure it will accept the filler material. When the material has cooled, the applicator and adapter are removed from the joint. The aperture into the bearing or bushing is then closed, either by reinstalling a grease fitting or a suitable plug.

Various types of plastics will serve the present purpose such as those known as ABS,ABS/PC, ABS/Polysulfore, ABS/PVC, Acetal, Acrylic, Acrylic Modified, Acrylic PVC, AS/Modified Olefin, Alkyd, Allyl Ester, Cellulose Acetate, Cellulose Butyrate, Cellulose Propionate, Chlorinated Polyethylene, Chlorinated PVC, Diallyl Phthalate, Ethyl Cellulose, Ethylene Ethylacrylate, Ethylene Propylene, Ethylene Vinylacetate, CTFE Fluorocarbon, FEP Fluorocarbon, PFA Fluorocarbon, PTFE Fluorocarbon, Fluoropolymer, Furan, Hydroxypropyl Cellulose, Ionomer, Melamine Formaldehyde, molybdenum disulphide ($MoS_2$) Nylon, Nylon 6, Nylon 6/6, Nylon 6/6-6, Nylon 6/9, Nylon 6/10, Nylon 6/12, Nylon 11, Nylon 12, "Nylatron", Phenylene Oxide, Polyacrylonitrite, Polyallomer, Polyamide-imide, Polyarylene Ether, Polyarylate, Polybutadiene 1, 2, Polybutylene, Polycarbonate, Polyester, Polyester (Copolyester), Polyester (PBT), Polyether Sulfone, Polyethylene, Polyethylene Terephthalate, Polyimide, Polyphenyl Sulfide, Polyphenyl Sulfone, Polypropylene, Polyolefin, Polystyrene, Polysulfone, Polyurethane (TP) Polyurethane (TS), Polyvinyl Chloride, PVC/EVA, PVC/Nitrile, PVC/Urethane, Polyvinylidene Fluoride, Poly P-xylylene, SAN, Silicone, Silicone/Epoxy, Styrene Butadiene, Styrene Copolymer, Terpolymer, Thermoplastic Elastomer, Urea Formaldehyde, and Vinyl Ester. It is important that the material used comprise a thermoplastic in order that material which has once been converted to a molten state in the nozzle of the barrel can be reheated and melted for the next job and also have the necessary bonding characteristics. It is of course important that the material have a selected melting point which can be reached by the heat from a torch and yet the melting point cannot be reached by normal ball joint or bushing conditions.

A material having desired characteristics for the present purpose comprises a material marketed by E. I. DuPont De Nemours and Co., under the trademark Zytel. This product comprises a nylon resin, specifically a toughened, glass reinforced 66 nylon having the formula [$NH(CH_2)_6 NHCO(CH_2)_4 CO$]n. This product has a selected amount of short glass fibers, for example 14 percent, as well as small amounts of lubricants, stabilizers, and pigments. It is a thermoplastic material and can be converted to a molten state by heat applied from a butane torch or the like. It also can be reheated and melted and have the necessary bonding characteristics after reheating.

The supply of repair material preferably is used in the form of cartridges 72. Since the rod 22 is shorter than the barrel and since the heat is applied at only the nozzle end of the barrel, solid cartridges 72 or portions thereof form a part of the push rod. Thus, the head 32 of the rod is more or less insulated from the molten material by solid material. If by chance some molten material should escape rearwardly to the area of the head, grooves 34 will pick it up to provide easy cleaning, rather than the difficult job of cleaning the entire barrel.

FIGS. 7–11 illustrate a modified form of the invention. Such embodiment shows the use of hydraulic drive and other modifications. It comprises a cylinder 110 with opposite end walls 112 and 114 including hydraulic inlet and outlet fittings 116 leading to a suitable valve 118 which, similar to the FIG. 1 embodiment, can be readily operated by one hand, or if desired the valve 118 can be foot controlled. The cylinder 110 has a piston 18' therein to which a heavy duty piston rod 120 is secured. This piston rod has sealed and guided movement through end wall 114 and has threaded connection 28' with a push rod 22' extending into a barrel 36' as in FIG. 1 having an inner surface 36a'. If desired, the cylinder may comprise a one-way cylinder with spring return. Barrel 36' has threaded support 38' in a forwardly spaced wall 122 secured integrally to the end walls 122 and 114 of the cylinder by support rods 124. Barrels 36 and 36' may be interchangeable for use on either an air or hydraulic cylinder.

Similar to the FIG. 1 embodiment, the second embodiment includes wrench engaging surfaces 40' adjacent the rearward end of the barrel, a nozzle or injecting end 44', a threaded end bore 46' for receiving an adapter 48, an inner tapered surface 52', shoulder portions 56' adjacent the end, and guide grooves 58' on the exterior surface of the barrel. Also in this embodiment, the push rod 22' has a head portion 32' and grooves 34' for catching molten material which may escape rearwardly, and in addition, push rod 22' is of a length less than the length of the barrel whereby the push rod will be in contact with solid cartridge material during operation of the tool. An indicator rod 64' has magnetic attachment 70' to an end flange 128 on the piston rod 120 and has guided movement through an aperture 130 in the forward wall 122.

The operation of the device shown in FIGS. 7-9 is the same as described in connection with FIG. 1. This embodiment illustrates further refinements, however, comprising an electric heat band 134, FIGS. 7 and 9, for applying heat to the end of the barrel, instead of using a torch, and also comprising control means illustrated in FIG. 9. The heat band 134 includes an electric element therein capable of heating the end of the barrel to a sufficient temperature to convert cartridges 72 to a molten state. This heat band may be permanently fitted in place or removably clamped on the barrel and is utilized with a control assembly 136 comprising a temperature control 138 having an adjusting knob 140 for adjustment of the band temperature to a selected degree. Also used in the control assembly is a thermocouple 83' arranged to sense the temperature of a joint or bushing to be repaired. Through suitable circuitry 141, the heat band 134 and its control 188, as well as the thermocouple 83' are connected to a computerized display device 142 having two readouts 144 and 146. The readout 144 displays alternately the temperature of the barrel as provided by the heat band 134 and the temperature sensed by the thermocouple 83'. The readout 146 displays the differential between these two temperatures, and when it approaches a desired differential or equalization of the two temperatures, the operator can apply power to the cylinder. Readouts 144 and 146 may appear as a single readout with sequential flashing of the temperatures and the differential.

FIGS. 10 and 11 illustrate thermocouple structure for best sensing the temperature of a bushing 50. In FIG. 10, the sensing portion of the thermocouple may comprise a slightly protruding or button end 150 of the sensing element which in the use of the thermocouple is merely touched up against the member 50. In FIG. 11, it may be desired to penetrate deeper into the member being sensed and for this purpose a thermocouple 83" is used having a projecting end 152 arranged to project into a bore 154 provided in the member 50 especially for this purpose.

FIG. 12 shows a further embodiment of hydraulic drive means comprising a cylinder 110' having end walls 112' and 114' and a forward spaced wall 122' in this structure. The piston rod in the cylinder assumes the FIG. 1 arrangement wherein such piston rod is secured to the piston and operates within the barrel. The barrel structure, heat band and mode of operation are the same as in connection with the other embodiments.

FIGS. 13-18 illustrate a further form of the invention and in particular show a modified form of indicator rod and heat sensing and indicating means. This embodiment includes a cylinder 160 with opposite end walls 162 and 164 and inlet fitting 166 leading to a suitable valve 168 which, similar to the FIG. 1 embodiment, can be readily operated by one hand, or if desired the valve 168 can be foot controlled. The cylinder 160 has a piston 170 to which a push rod 172 is secured and extends into a barrel 174, as in FIG. 1, having an inner surface 174a. Barrel 174 has threaded support 176 in cylinder wall 164, and similar to the FIG. 1 embodiment, has a nozzle or injecting end 180, a threaded end bore 182 for receiving an adapter 48, an inner tapered surface 184, and indicating grooves 186 on the exterior surface of the barrel. Also in this embodiment, the push rod 172 has a head portion 188 with circumferential grooves 190 for catching molten material which may escape rearwardly. The push rod operates on a solid cartridge 194 for injecting melted portions of the cartridge into a mold area, such as a worn bearing 50.

An indicating rod 196 is connected to the piston 170 and has guided movement through an aperture 198 in the end wall 164 of the piston. In this embodiment, it is desired that the indicating rod 196 have a positive securement to the piston 170 so as to travel therewith at all times. For this purpose, the face of the piston is provided with a recess 204 with side laterals 206 provided between the face of the piston and the bottom of the recess. Indicating rod 196 has a snap ring 208 mounted adjacent its inner end which has a diameter larger than the width of recess 204 and arranged for sliding but locking engagement in the side laterals 206. Snap ring 208 has an open or cutaway portion 210 which reduces the diameter of the ring at this point to a dimension less than the width of groove 204. The rod is connected into the groove 204 by tilting it with the side opposite from the open portion 210 pointed into the groove and into one side lateral Then when the rod is pivoted to a straight out position relative to the face of the piston the ring is locked in place. By such arrangement, the indicating rod can be positioned during assembly around the piston as necessary for association with indicating grooves 186. It is also rotatable on its own axis.

FIGS. 13 and 14 also show structure wherein a thermocouple and temperature readout are integrated with the barrel 174. In such structure, the sensing head 214 of a thermocouple is buried in the nozzle end of the barrel and lead wires 216 from the sensing head are also buried in the barrel and extend rearwardly to a display device 218 having one or more readouts 220. Readout 220 displays the temperature of the nozzle as provided by a heat band 222 or other heating means. Display device 218 is secured on the barrel in a manner such as shown in FIG. 14, including a clamp member 224 which together with the display device 218 has a recessed fit on the barrel. By means of the display device 218, controlled operation of the injecting device is accomplished.

With reference to FIG. 19, an embodiment of the invention is shown comprising drive and injecting structure similar to FIG. 13 with the exception that the barrel 226 for the push rod 172 has sighting means 228 designed to provide visual location of the head 188 of the push rod. In such structure, the sighting means 228 may comprise a plurality of apertures in the barrel as shown or also it could comprise transparent barrel portions. By such sighting means, the operator can tell the position of the push rod and determine the extent of injection of material, similar to the function of the indicating rod 196.

FIGS. 20-22 show a modified form of core member 230 which functions similar to the core members 84 and 84' of FIGS. 4 and 5, respectively, but with added functions as will now be described. Core member 230 is mounted in a barrel 232 having a tapered end 234 similar to the arrangement described in connection with FIGS. 4 and 5, and also having a straight inner wall surface 232a.

Core member 230 has a front taper 236 and a rear taper 238, each of such tapered portions comprising a cone shaped structure. Projecting radially from the front tapered surface 236 rearwardly of the front end are longitudinally stabilizing projections 242 which bear against the tapered surface 234 and provide a concentric stabilized fit of the core member in the tapered portion 234. The tapered portion 236 of the core member is smaller in diameter than the tapered portion 234 of the barrel to provide for the flow of material therebetween. The number of projections 242 may vary, the requirement being that the wedging engagement thereof with the inner tapered surface of the barrel keep the core member centered. The rearward ends 244 of projections 242 are bevelled to a radially extending sharp edge.

Offset circumferentially from the front stabilizing projections 242 are rear longitudinally stabilizing projections 248 disposed forwardly of the rearward pointed end. These projections have a dimension arranged for engagement with the inner surface 232a of the barrel for positively holding the core member, in combination with the front projections 242, concentrically in the barrel. The rearward ends 250 of projections 248 are bevelled to a radially extending sharpened radial edge. Four each of projections 242 and 248 are shown but the number thereof may vary as long as the core member is stabilized in its concentric position in the barrel. As molten material is forced past the core member, it will first flow over the pointed end 238 to direct it around the core member and subject it to heat transfer from the core member. The molten material is then further divided by the sharpened ends 244 and 250 of the projections 242 and 248, respectively. This provides a good mixing or agitation of the flowing material for subjecting it to the exterior heating means. Additional mixing or agitation of the flowing material over the core member is accomplished by ramp portions 252 adjacent the projections 248 and ramp portions 254 leading into each of the ends 244 of projections 242. Ramp portions 256 are also provided at the forward ends of projections 248 for this purpose.

FIGS. 23 and 24 show an embodiment of the invention wherein a core member 260 is formed as an integral part of the barrel 262. For this purpose, the barrel is formed of two pieces 262 and 262a secured integrally together after internal construction by a lap joint connection 264. Barrel portion 262 has a tapered surface 266 adjacent the forward end which terminates rearwardly in an inwardly directed circumferential rib 268 having a plurality of apertures 270 extending parallel to the axis of the barrel. Rib 268 defines a central opening 272 in the barrel.

Barrel portion 262a is machined with core member 260 as an integral part thereof, such core member being supported by an annular wall 274 extending inwardly adjacent the end of barrel portion 262a. Annular wall 274 has a plurality of apertures 276 extending parallel to the axis of the barrel and staggered circumferentially from the apertures 270 in barrel portion 262. An intermediate portion of core member 260 has a diameter which fits snugly in the central opening 272 defined by circumferential rib 268.

Core member 260 has a cone-shaped front end 280 and a cone-shaped rearward end 282, the latter taper spreading the molten material for uniform and fast heating, and the forward tapered end providing a uniform tapered flow in association with tapered surface 266 to the outlet of the injecting device. After the molten material flows over the rear taper 282, it jogs laterally from apertures 276 to 268 for mixing and uniform heating.

FIG. 25 illustrates an embodiment which utilizes a pressured gas operated piston cylinder assembly as the power medium but which utilizes an hydraulically operated piston cylinder assembly for the injection piston. The injection portion is similar to other embodiments, having a cylinder 290 with a piston 292 therein connected at one end to a push rod 294 having an enlarged head end 296. Push rod 294 slidably operates in a barrel 298 having an injecting end similar to other embodiments. Barrel 298 has a longitudinal slot 304 with side calibrations 305 in a rearward portion thereof, and a handle projection 306 integral with the push rod extends through this slot. Projection 306 allows the operator to manually slide the push rod 294 and its piston 292 rearwardly following an injection step, as will be explained in greater detail hereinafter. This embodiment employs thermocouple means 308 and heat display means 310 to accomplish operating functions as in FIG. 13.

Pressured gas power means for the injection device comprises a cylinder 318 and piston 320 therein. One face of piston 320 has a pair of tapped bores 322 and 324 therein. These bores extend part way into the piston. Bore 324 communicates with a bore 326 leading to the other end of the piston. Fittings 328 are provided on the piston ends of the cylinders 290 and 318 and provide for communication between these cylinders by means of a flexible hose 330.

Cylinder 318 is associated with a valve mechanism 332 threadedly secured thereto and having a fitting 334 arranged for connection to a source of gas pressure. Valve mechanism 332 has inlet passageway 336 controlled in its communication with an outlet passageway 338 into the cylinder 318 by means of an on-off valve 340. A pressure release valve 342 and passageway 344 associated therewith control communication of gas pressure between the cylinder 318 and atmosphere.

The concept of the FIG. 25 embodiment is to provide gas pressure power for the injecting device but to have an intermediate fluid connection between the pistons 292 and 320, the purpose being to eliminate possible bodily harm caused by escape of high pressure gas in the event that the connecting hose used between the high pressure power source and the injecting device should rupture or be damaged. Thus, instead of a sudden release of high gas pressure adjacent a person handling the injecting tool, there will merely be a spray or stream of liquid, and such is only remotely possible of causing bodily harm to the operator.

For readying the system of FIG. 25 cylinder 290 and the hose 330 are suitably filled with hydraulic fluid. In this process the bore 322 is adapted to receive a tool for retracting piston 320. Bores 324 and 326 allow for the filling of the system with fluid, after which a plug 324a is installed therein. This provides a positive drive from piston 320 to the piston 292, the valve 340 being open during the injection process and the valve 342 being closed. When it is necessary to reload the injection device or otherwise to retract the piston 320, the operator closes valve 340 and opens valve 342. He then manually retracts the push rod 294 by grasping handle 306. This pushes piston 292 rearwardly in the cylinder 290 and the fluid connection pushes the piston 320 forward in cylinder 318. For pressure drive in the operation of the injecting device, the valve 342 is again closed and the valve 340 opened. Gas pressure thus operates through the liquid connection to drive the piston 292 for the injection molding process.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described my invention, I claim:

1. An injection molding tool comprising:

a fluid operated cylinder having opposite ends, fluid inlet and outlet means in said cylinder, a piston in said cylinder, a piston rod having one end secured to said piston and having a free end projecting from said other end of the cylinder, an enlarged head portion on the free end of said piston rod having a face surface, an applicator barrel having an interior surface and also having opposite ends, said barrel being supported at one of its ends on said cylinder and the other end comprising an ejecting nozzle with an outlet opening, said piston rod extending into said applicator barrel and being arranged upon heating said ejecting nozzle and operation of said cylinder to force a molten portion of a solid resin cartridge in said barrel through said nozzle opening, and a heat conducting core member within said barrel adjacent said ejecting nozzle, said core member being of reduced diameter relative to said interior surface of said barrel to provide a passageway for molten material therearound, and heat conducting mounting means leading from said core member to the exterior of said barrel.

2. The injection molding tool of claim 1 wherein said heat conducting mounting means comprises radial pins secured to said core member and projecting through said barrel to the exterior of the latter.

3. An injection molding tool comprising
a fluid operated cylinder having opposite ends,
fluid inlet and outlet means in said cylinder,
a piston in said cylinder,
a piston rod having one end secured to said piston and having a free end projecting from said other end of the cylinder,
an enlarged head portion on the free end of said piston rod having a face surface,
one or more lateral recesses around said head portion of said piston rod to catch molten material which may escape rearwardly past the solid cartridges,
and an applicator barrel having an interior surface and also having opposite ends, said barrel being supported at one of its ends on said cylinder and the other end comprising an ejecting nozzle with an outlet opening,
said piston rod extending into said applicator barrel and being arranged upon heating said ejecting nozzle and operation of said cylinder to force a molten portion of a solid resin cartridge in said barrel through said nozzle opening.

4. An injection molding tool comprising
a fluid operated cylinder having opposite ends,
fluid inlet and outlet means in said cylinder,
a piston in said cylinder,
a piston rod having one end secured to said piston and having a free end projecting from said other end of the cylinder,
an enlarged head portion on the free end of said piston rod having a face surface,
an applicator barrel having an interior surface and also having opposite ends, said barrel being supported at one of its ends on said cylinder and the other end comprising an ejecting nozzle with an outlet opening,
said piston rod extending into said applicator barrel and being arranged upon heating said ejecting nozzle and operation of said cylinder to force a molten portion of a solid resin cartridge in said barrel through said nozzle opening,
and an indicator rod movable with said piston and having a free end projecting through said other end of said cylinder in parallel relation with said piston rod exteriorly of said barrel,
the length of said indicator rod being such that the free end thereof is laterally aligned with the face surface of said head portion.

5. The applicating tool of claim 4 wherein said indicator rod is releasably securable to said piston.

6. The applicating tool of claim 4 wherein said indicator rod is magnetically and releasably securable to said piston.

7. An injection molding tool comprising:
a fluid operated cylinder having opposite ends,
fluid inlet and outlet means in said cylinder,
a piston in said cylinder,
a piston rod having one end secured to said piston and having a free end projecting from said other end of the cylinder,
a head portion on the free end of said piston rod having a face surface,
an applicator barrel having an interior surface and also having opposite ends, said barrel being supported at one of its ends on said cylinder and the other end of said barrel comprising an ejecting nozzle with an outlet opening,
said piston rod extending into said applicator barrel and being arranged upon heating said ejecting nozzle and operation of said fluid operated cylinder to force a molten portion of a solid resin cartridge in said barrel through said nozzle opening,
said nozzle opening being of reduced diameter relative to the interior surface of said barrel and communicating with said interior surface by a tapered surface,
and a heat conducting core member mounted within said barrel,
said core member being of reduced diameter relative to the interior of said barrel to provide a passageway for molten material therearound,
said core member having oppositely directed tapered cone-shaped surfaces,
one of said cone-shaped surfaces being of reduced diameter relative to said tapered surface and of said barrel and directed into said tapered surface and the other of said cone-shaped surfaces being directed into molten material in said barrel being advanced by said piston for directing the molten material in said passageway around said core member and uniformly heating it. around.

8. The injection molding tool of claim 7 wherein said head portion of said piston rod includes one or more lateral recesses therearound to catch molten material which may escape rearwardly past the solid cartridges.

9. The injection molding tool of claim 7 including an indicator rod movable with said piston and having a free end projecting in parallel relation with said piston rod exteriorly of said barrel, the length of said indicator rod being such that the free end thereof is laterally aligned with the face surface of said head portion.

10. The injection molding tool of claim 7 wherein said barrel has sighting means through the walls thereof such that an operator can tell by sight the position of said head portion of said piston rod in said barrel.

11. The injection molding tool of claim 7 wherein surfaces of said core member are uneven to cause agitation of molten material flowing past said core member.

12. The injection molding tool of claim 7 wherein surfaces of said core member have radially extending separating edges and intermediate ramps and inclines to cause agitation of molten material flowing past said core member.

13. The injection molding tool of claim 7 wherein said barrel is formed of at least two parts connectable together adjacent said core member, said core member being formed integrally with one of said barrel parts and having one of its tapered surfaces projecting into said other barrel part.

14. The injection molding tool of claim 7 wherein said piston is operated hydraulically, and said injection molding tool further comprising second piston and cylinder means independent of said hydraulically operated piston, the piston of said second piston and cylinder means being operated by pressured gas and having communication with said hydraulically operated piston by a flexible hose for driving said hydraulically operated piston.

15. The injection molding tool of claim 7 including a thermocouple arranged to be removably attached to said tool, and coupler means on said barrel arranged for connection to said thermocouple for sensing the temperature within the barrel, said thermocouple including a sensing head embedded in said barrel adjacent said ejecting nozzle and having circuitry for said thermocouple leading away from said nozzle and also embedded in said barrel.

16. The injection molding tool of claim 15 including electrically operated display means electrically connected to said thermocouple and displaying temperature of said ejecting nozzle.

17. An injection molding tool comprising:
- an hydraulically operated piston cylinder assembly having opposite ends,
- hydraulically inlet and outlet means in said assembly,
- a piston rod in said assembly having a free end projecting from said cylinder,
- a head portion on the free end of said piston rod having a face surface,
- an applicator barrel having an interior surface and also having opposite ends, said barrel being supported at one of its ends on said piston cylinder assembly and the other end of said barrel comprising an ejecting nozzle with an outlet opening,
- said piston rod extending into said applicator barrel and being arranged upon heating said ejecting nozzle and operation of said piston cylinder assembly to force a molten portion of a solid resin cartridge in said barrel through said nozzle opening,
- said nozzle opening being of reduced diameter relative to the interior surface of said barrel and communicating with said interior surface by a tapered surface,
- a gas pressure operated piston cylinder assembly independent of said hydraulic piston cylinder assembly,
- and flexible hose means establishing communication between said two piston cylinder assemblies in an arrangement wherein said gas pressure operated cylinder assembly drives said hydraulically operated piston.

* * * * *